(12) United States Patent
Agarwal (10) Patent No.: US 10,503,175 B2
(45) Date of Patent: Dec. 10, 2019

(54) LIDAR SIGNAL COMPRESSION

(71) Applicant: Ford Global Technologies, LLC, Dearborn, MI (US)

(72) Inventor: Siddharth Agarwal, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 131 days.

(21) Appl. No.: 15/794,853

(22) Filed: Oct. 26, 2017

(65) Prior Publication Data

US 2019/0129441 A1   May 2, 2019

(51) Int. Cl.
| | |
|---|---|
| *G06F 7/00* | (2006.01) |
| *G05D 1/02* | (2006.01) |
| *G01S 17/93* | (2006.01) |
| *G06F 9/30* | (2018.01) |
| *B60W 30/18* | (2012.01) |

(52) U.S. Cl.
CPC .......... *G05D 1/0238* (2013.01); *G01S 17/936* (2013.01); *G06F 9/3001* (2013.01); *G06F 9/30181* (2013.01); *B60W 30/18* (2013.01); *B60W 2420/52* (2013.01); *B60W 2510/06* (2013.01); *B60W 2510/08* (2013.01); *B60W 2510/18* (2013.01); *B60W 2510/20* (2013.01)

(58) Field of Classification Search
None
See application file for complete search history.

(56) References Cited

U.S. PATENT DOCUMENTS

| | | | |
|---|---|---|---|
| 8,880,571 B2* | 11/2014 | Srinivasan | H03M 7/24 708/200 |
| 2004/0151394 A1 | 8/2004 | Soderberg et al. | |
| 2010/0140909 A1 | 6/2010 | Jang | |
| 2013/0262539 A1* | 10/2013 | Wegener | G06F 7/483 708/204 |
| 2014/0062069 A1 | 3/2014 | Fukawatase | |
| 2014/0327234 A1 | 11/2014 | Heurlin et al. | |
| 2015/0091278 A1 | 4/2015 | Yasuoka | |
| 2015/0378674 A1* | 12/2015 | Ruff | H03M 7/06 708/204 |
| 2016/0061940 A1* | 3/2016 | Walsh | G01S 7/4817 356/4.01 |
| 2016/0062954 A1* | 3/2016 | Ruff | G06F 17/21 715/249 |
| 2016/0082915 A1 | 3/2016 | Madaras | |
| 2016/0221592 A1 | 8/2016 | Puttagunta et al. | |
| 2016/0286216 A1 | 9/2016 | Pflug | |
| 2017/0052032 A1 | 2/2017 | Miksa et al. | |
| 2019/0129441 A1* | 5/2019 | Agarwal | G06F 9/3001 |

FOREIGN PATENT DOCUMENTS

| | | |
|---|---|---|
| CN | 103347185 B | 8/2016 |
| CN | 105847174 A | 8/2016 |
| DE | 102014004185 A1 | 9/2015 |

* cited by examiner

*Primary Examiner* — David H Malzahn
(74) *Attorney, Agent, or Firm* — Frank A. MacKenzie; Bejin Bieneman PLC (57) ABSTRACT

A system includes a processor and a memory. The memory stores instructions executable by the processor to receive sensor data including floating-point numbers. The memory stores instructions to convert the floating-point numbers to integer numbers based on a parameter set. The memory stores instructions to actuate a vehicle component based on the integer numbers.

17 Claims, 4 Drawing Sheets

LIDAR SIGNAL COMPRESSION

BACKGROUND

Vehicle computers typically operate based at least in part on data received from vehicle sensors. A vehicle sensor may measure a physical parameter such as vehicle speed, ambient temperature, distance from objects, etc. Such vehicle sensors generate large quantities of data. These large quantities of sensor data need to be stored, processed, and/or transmitted via communication networks. Current systems and methods for addressing memory storage that affect data transmission bandwidth are lacking in efficiency and effectiveness.

DETAILED DESCRIPTION

Introduction

Disclosed herein is a system that includes a processor and a memory. The memory stores instructions executable by the processor to receive sensor data including floating-point numbers, convert the floating-point numbers to integer numbers based on a parameter set, and actuate a vehicle component based on the compressed integer numbers.

The sensor data may be LIDAR data, and the parameter set may include a bit length parameter, the instructions may further include instructions to determine the bit length parameter based on the LIDAR data.

The instructions may further include instructions to determine as parameters a maximum and a minimum of the floating-point numbers, and determine the bit length parameter based on the minimum and maximum as well as a stored precision parameter.

The instructions may further include instructions to convert the floating-point numbers to the integer numbers based on the bit length parameter.

The sensor data may be LIDAR data, and the instructions may further include instructions to apply a compression algorithm to the integer numbers and actuate the vehicle component by transmitting the compressed integer numbers representing LIDAR data to a second processor.

The instructions may further include instructions to transmit the parameter set with the compressed integer numbers representing LIDAR data to the second processor.

The system may further include the second processor and a second memory, the second memory storing instructions executable by the processor to decompress the compressed integer numbers representing LIDAR data.

Decompressing the compressed integer numbers may further include decompressing the compressed integer numbers, and then converting the decompressed integer numbers to the floating-point numbers.

The instructions may further include instructions to convert the decompressed integer numbers based on the bit length parameter.

The sensor data may be LIDAR data that includes z-Height map data and the instructions may further include instructions to determine the z-Height map data based on received reflections at a vehicle LIDAR sensor from a vehicle exterior area.

Further disclosed herein is a method including receiving sensor data including floating-point numbers, converting the floating-point numbers to integer numbers based on a parameter set, and actuating a vehicle component based on the compressed integer numbers.

The method may further include determining the bit length parameter based on the LIDAR data, wherein the sensor data is LIDAR data, and the parameter set includes a bit length parameter.

The method may further include determining as parameters a maximum and a minimum of the floating-point numbers, and determining the bit length parameter based on the minimum and maximum as well as a stored precision parameter.

The method may further include converting the floating-point numbers to the integer numbers based on the bit length parameter and applying a compression algorithm to the integer numbers.

The method may further include decompressing, in a second processor, the compressed integer numbers representing LIDAR data.

Decompressing the compressed integer numbers may further include decompressing the compressed integer numbers, and then converting the decompressed integer numbers to the floating-point numbers.

The method may further include converting the decompressed integer numbers based on the bit length parameter.

Further disclosed herein is a system including a sensor, comprising a first processor and a first memory, and a computer, comprising a second processor and a second memory. The first memory stores instructions executable by the first processor to receive sensor data including floating-point numbers, convert the floating-point numbers to integer numbers based on a parameter set, apply a compression algorithm to the integer numbers, and transmit the compressed integer numbers via a communication network. The second memory stores instructions executable by the second processor to receive the compressed integer numbers, decompress the compressed integer numbers, and convert the decompressed integer numbers to the floating-point numbers, and perform a vehicle operation based on the floating numbers.

The sensor data may be LIDAR data, and the parameter set may include a bit length parameter, the instructions stored in the first memory may further include instructions to determine the bit length parameter based on the LIDAR data.

The instructions stored in the first memory may further include instructions to determine as parameters a maximum and a minimum of the floating-point numbers, and determine the bit length parameter based on the minimum and maximum as well as a stored precision parameter.

Further disclosed is a computing device programmed to execute the any of the above method steps.

Yet further disclosed is a computer program product, comprising a computer readable medium storing instructions executable by a computer processor, to execute any of the above method steps.

System Elements

Figure 1:
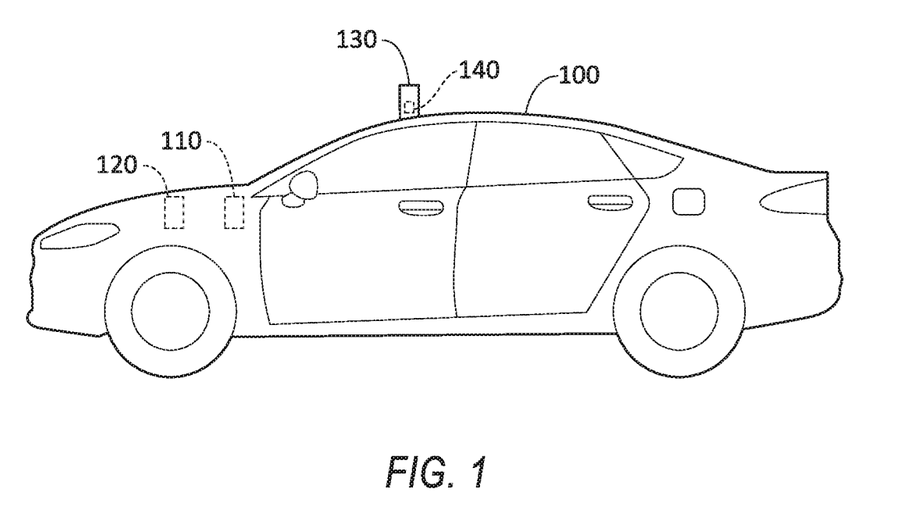
FIG. 1 is a block diagram of an exemplary vehicle including a LIDAR sensor.

FIG. 1 illustrates an example host vehicle 100 including a computer 110, actuator(s) 120, a (Light Detection and Ranging) LIDAR sensor 130, and other components discussed herein below. The vehicles 100 may be powered in variety of known ways, e.g., including with an electric motor and/or internal combustion engine.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering; in a non-autonomous mode, a human operator controls vehicle propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network such as a bus in the vehicle such as a controller area network (CAN) or the like.

Via the vehicle network, the computer 110 may transmit messages to various devices in the vehicle and/or receive messages from the various devices, e.g., the LIDAR sensor 130, actuators, etc. Alternatively or additionally, in cases where the computer 110 actually comprises multiple devices, the vehicle communication network may be used for communications between devices represented as the computer 110 in this disclosure. Further, as mentioned below, various controllers and/or sensors may provide data to the computer 110 via the vehicle communication network.

The vehicle 100 actuators 120 may be implemented via circuits, chips, or other electronic components that can actuate various vehicle subsystems in accordance with appropriate control signals as is known. The actuators 120 may be used to control braking, acceleration, and steering of the first vehicle 100. As an example, the vehicle 100 computer 110 may output control instructions to control the actuators 120.

The vehicle 100 may include one or more LIDAR sensor(s) 130, providing data encompassing at least some of an exterior of the vehicle 100. The LIDAR sensor 130 may include a computer 140 that is programmed to transmit LIDAR data. The LIDAR data may be received by the vehicle 100 computer 110 from LIDAR sensors 130 in a known manner, e.g., via a vehicle 100 network. The LIDAR data may include coordinates, e.g., in a 3-dimensional or cartesian coordinate system. LIDAR data may further include other data pertaining to other objects such as size, relative speed to the host vehicle 100, etc. In one example shown in FIG. 2, a LIDAR sensor 130 may sweep an area in the LIDAR sensor 130 field of view, e.g., an area around the vehicle 100, by transmitting LIDAR beams, e.g., laser beams, and receive reflections of the transmitted LIDAR beams. Typically, a LIDAR sensor 130 can provide data for mapping physical features of sensed objects with a very high resolution.

Figure 2:
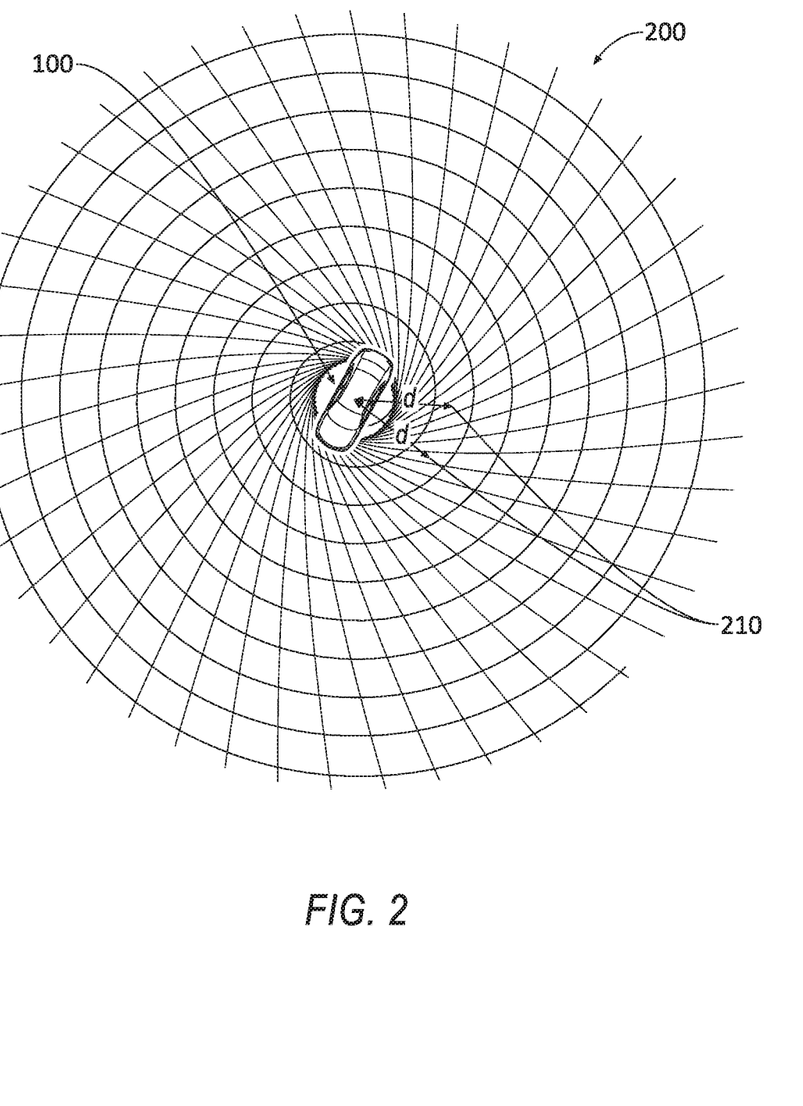
FIG. 2 shows the vehicle of FIG. 1 and an example grid for z-height map superimposed on an area around the vehicle.

In one example, shown in FIG. 2, the LIDAR sensor 130 computer 140 and/or the computer 110 may be programmed to generate "z-height map" data based on received reflections from an area within the field of view of the LIDAR sensor 130 and around the vehicle 100. The "z-height map" data refers to a set of measured distances from the LIDAR sensor 130 to each of a plurality of cells 210 within a grid 200 around the vehicle 100. For example, the grid 200 may include multiple cells 210 with predetermined dimensions, e.g., 10 centimeter (cm) by 10 cm, positioned next to one another on a ground surface around the vehicle 100 extending horizontally from the vehicle 100 up to e.g., 150 meters from the vehicle 100. The grid 200 data such as locations, dimensions, etc., of cells 210 may be stored in a vehicle 100 computer 110 memory. A z-height map may include each of distances d from the LIDAR sensor 130 to a center of each cell 210. In on example, the z-height map data may include a two-dimensional array of data. Each element of the array may be a floating-point number that corresponds to a distance d from the vehicle 100 to a cell 210. In one example, the two-dimensional array may be a 400×400 array, i.e., including 400 rows, and each row may have 400 columns. For example, the sensor 130 computer 140 may be programmed to determine a distance d from a cell 210 or object based on multiple reflections from multiple points in the respective cell 210. The sensor 130 computer 140 may be programmed to determine object data based at least in part on the received z-height map data.

The measured distances d may be determined and stored as floating-point numbers, e.g., in units of meters. Thus, the z-height map typically include multiple floating-point numbers. A floating-point number, as is conventionally understood, is an arithmetic representation of a real number; in a floating-point number, the location of decimal point is not fixed; but can "float." Alternatively, a real number can be represented as a fixed-point number. Thus, in a fixed-point operation, a computer may be programmed to operate with numbers that include a fixed (i.e., constant) number of digits after a decimal point, e.g., two, whereas in a floating-point operation, a computer 110, 140 may be programmed to operate with various numbers of digits after a decimal point, e.g., based on values and precisions of numbers being represented. Although, using floating-point numbers is advantageous because the computer 110, 140 can be programmed to optimize calculations by identifying a trade-off between range and precision of the numbers, representing a number in floating-point typically takes more memory space than representation as an integer number. Additionally, transmitting floating-point data, e.g., via the vehicle 100 communication network may consume large amount of bandwidth. "Bandwidth" in the present context refers to an amount of information that can be transmitted through a communication medium in a given duration of time. Thus, bandwidth used to transmit data including floating-point numbers representing a real number typically is larger than bandwidth used to transmit data including integer numbers representing the real number. On the other hand, it is a problem that converting floating-point numbers to integer number by removing fractional or decimal values may cause a loss of information. For example, converting a floating-point number 2.31 to an integer number 2 causes loss of decimal point information 0.31. One problem solved herein is the conversion of floating-point to integer data, advantageously reducing needed bandwidth and/or storage space, the same time reducing lost information due to this conversion.

The sensor 130 computer 140 and/or the computer 110 can be programmed to receive sensor 130 data including floating-point numbers, and to convert the floating-point numbers to integer numbers based on a sensor 130 data parameter set. The parameter set includes data used to convert the floating-point data to integer data and to convert the integer data back to floating-point data, as both described below. The sensor 130 computer 140 can be programmed to actuate a vehicle component based on the integer numbers. Additionally or alternatively, the sensor 130 computer 140 can be further programmed to apply a compression algorithm to the integer numbers, and to actuate a vehicle component based on the compressed integer numbers.

The sensor 130 data may include LIDAR sensor 130 data such as z-height map data. For convenience, an example 4×4 array of LIDAR sensor 130 data, as show in Table 1, is used herein as an example in explaining the conversion of floating-point numbers to integer numbers and then converting them back to floating-point.

TABLE 1

$$\begin{bmatrix} 1.00 & 1.25 & 1.50 & 1.75 \\ 1.25 & 1.50 & 1.75 & 2.00 \\ 1.50 & 1.75 & 2.00 & 2.25 \\ 1.75 & 2.00 & 2.25 & 2.25 \end{bmatrix}$$

A sensor 130 data parameter set includes a minimum (Min) and a maximum (Max) of the floating-point numbers. For example, the sensor 130 computer 140 may be programmed to determine a maximum Max and a minimum Min of the floating-point numbers. For example, the sensor 130 computer 140 may be programmed to determine 1.00 and 2.25 as the minimum Min and maximum Max of the example floating-point numbers denoted by F.

The parameter set includes the Minimum Min, Maximum Max, and a bit length parameter (BLP). The sensor 130 computer 140 may be programmed to determine the bit length parameter BLP based on the determined minimum Min and maximum Max. Additionally, the sensor 130 computer 140 may be programmed to determine the bit length parameter BLP based on a precision parameter (Prec).

The precision parameter Prec refers herein to a number of decimal points in the set of floating-point numbers F. The precision parameter Prec determines a portion of decimal information in the floating-point numbers that are expected to be maintained through the conversion process. For example, a precision parameter of 2 means that in converting a floating number 2.3567, the decimal point beyond the second decimal point will be eliminated, e.g., the information 0.0067 may be lost through the conversion. The precision parameter Prec may be stored in a computer 140 memory, a sensor 130 memory, etc. Additionally or alternatively, the sensor 130 computer 140 may be programmed to receive the precision parameter Prec from a remote computer.

The bit length parameter BLP is, in the present context, a maximum number of bits used to store the integer number (i.e., a result of converting a floating-point number to an integer) in the Boolean format. "Boolean" data format includes two possible values: true (or one) and false (or zero). In other words, the bit length parameter BLP defines the maximum number of bits the computer 140 may use to store the integer number in a computer 140 memory or transmit via a communication network. The BLP is defined as:

$$BLP = \text{ceiling}\left(\frac{\log((\text{Max} - \text{Min}) \cdot 10^{Prec})}{\log(2)}\right) \quad (1)$$

The "ceiling" operation or function takes a real number as input and outputs a least integer number that is greater than or equal to the input. The "floor" operation takes as input a real number such as the received floating-point number and outputs a greatest integer that is less than or equal to the input. The computer 140 may be programmed to determine the BLP based on the operation (1). For example, the BLP for the data of Table 1 defined based on the operation (1) is 7. In other words, the generated integers from converting the floating-point numbers of Table 1 may at maximum have 7 bits when represented in Boolean form.

The computer 140 may be programmed to determine a maximum integer parameter (PMax) based on the determined bit length parameter (BLP). The maximum integer parameter (PMax) is defined as shown in operation (2). For example, the maximum integer parameter (PMax) for the received floating-point numbers of Table 1 is 127. In other words, the maximum integer parameter PMax is a maximum integer value can be represented in 7 bits (because the determined BLP is 7).

$$PMax = 2^{BLP} - 1 \quad (2)$$

The computer 140 can be programmed to convert the floating-point numbers (F) to the integer numbers (denoted by I) based on the bit length parameter (BLP). In one example, the computer 140 may be programmed to convert each of the floating-point number F of the received sensor 130 data, e.g., the two-dimensional z-height map of Table 1 to an integer number I. Each of the integer numbers I is defined based on the respective floating-point F number as:

$$I = (F - \text{Min}) \cdot 10^{Prec} \quad (3)$$

For example, the computer 140 may be programmed to convert each of the floating-point numbers F of Table 1 based on operation (3). The resulted integer numbers I are shown in Table 2 below. Each element of the Table 2 corresponds to a floating-point number of Table 1. For example, integer number 50 at the second row and second column of Table 2 is a result of converting the floating-point number 1.50 at the second row and second column of Table 1 based on operation (4).

TABLE 2

$$\begin{bmatrix} 0 & 25 & 50 & 75 \\ 25 & 50 & 75 & 100 \\ 50 & 75 & 100 & 125 \\ 75 & 100 & 125 & 125 \end{bmatrix}$$

Additionally, the computer 140 may be programmed to compress the integer numbers I prior to transmission via a communication network, using a data compression algorithm as is known. Thus, advantageously, in this example, the transmitted data not only is reduced in size by converting the floating-point numbers F to integer numbers I, but also by compressing the integer numbers I. A compression algorithm allows a compression of data, e.g., for storage, transmission, etc. The compressed data can be then reconstructed or decompressed, e.g., at a receiver computer that receives the compressed data.

The computer 140 may be programmed to append the parameter set to the integer numbers I for transmission to, e.g., the vehicle 100 computer 110. In other words, the computer 140 may be programmed to transmit the parameter set, e.g., the bit length parameter BLP, the precision parameter Prec, etc., with the integer numbers I representing the sensor 130 data, e.g., the LIDAR data, to the second processor. As discussed above, the computer 140 may be programmed to determine the integer numbers I based on the floating-point numbers F and the parameter set. Therefore, as discussed below, the vehicle 100 computer 110 may reconstruct the floating-point numbers based on the integer numbers I and the received parameter set.

The vehicle 100 computer 110 may be programmed to receive the compressed integer numbers and to decompress the received compressed integer numbers representing the sensor 130 data. The vehicle 100 computer 110 may be further programmed to receive information, e.g., stored in the vehicle 100 computer 110 and/or received via the vehicle 100 communication network, including information about the compression algorithm used to compress the integer numbers and to decompress the received compressed integer numbers based in part on the received information. The vehicle 100 computer 110 may be programmed to decompress the compressed integer numbers by decompressing the compressed integer numbers and then converting the decompressed integer numbers to floating-point numbers. For example, the vehicle 100 computer 110 may be programmed to convert the integer numbers to floating-point numbers based on the bit length parameter. "Converting the integer numbers to the floating-point numbers" may also be referred to reconstructing the floating-point numbers. Additionally or alternatively, the vehicle 100 computer 110 may be programmed to receive the integer numbers and convert the received integer numbers to floating-point numbers based on the bit length parameter.

The vehicle 100 computer 110 may be programmed to determine reconstructed floating-point number RF based on the operation (4) below.

$$RF = \text{Min} + \frac{I}{10^{Prec}} \quad (4)$$

For example, the vehicle 100 computer 110 may be programmed to receive the compressed LIDAR sensor 130 z-height map data and to determine the z-Height map data based on received reflections at a vehicle 100 LIDAR sensor 130 from a vehicle 100 exterior area. In such example, the vehicle 100 computer 110 may be programmed to determine each of the reconstructed floating-point numbers RF using the operation (4) based on a respective integer number I as shown in Table 2. Table 3 shows example reconstructed floating-point numbers RF based on the received integer numbers I of Table 2.

TABLE 3

$$\begin{bmatrix} 1.00 & 1.25 & 1.50 & 1.75 \\ 1.25 & 1.50 & 1.75 & 2.00 \\ 1.50 & 1.75 & 2.00 & 2.25 \\ 1.75 & 2.00 & 2.25 & 2.25 \end{bmatrix}$$

In the example z-height map data of Table 1, each of the floating-point numbers F may be stored in 4 bytes, i.e., 32 bits. However, as discussed above with reference to the bit length parameter BLP, the converted integer numbers each may use maximum of 7 bits. Thus, through the conversion of floating-point numbers F to the integer numbers I, an amount of memory used by the integer numbers I is 21.876% of the memory used by the original floating-point numbers F. Although the conversion of the floating-point numbers F to the integer numbers I may have an advantage in size of memory used to store the information and/or a bandwidth used for data transmission, the above described compression of the data may cause a loss of information. In other words, as shown in the example above, the reconstruction of data may not necessarily reconstruct the same original floating-point numbers F. In the context of data compression and reconstruction, this may be referred to as a lossy data compression, whereas data reconstruction which generates the same original floating-point numbers is herein referred to as a lossless conversion. For example, by comparing the reconstructed floating-point numbers RF of Table 3 to the original floating-point numbers F of Table 1, it can be seen that all of the reconstructed floating-point numbers RF are same as the original floating-point numbers F. Thus, that is a lossless conversion. In another example, if the precision parameter Prec is set to 1, i.e., one digit after a decimal point used in the data conversion, then the reconstructed floating-point numbers RF as shown in Table 4 can be determined. By comparing the reconstructed floating-point numbers RF of Table 4 to the original floating-point numbers F of Table 1, it can be seen that at least some of the reconstructed floating-point numbers RF differ from the original floating-point numbers RF. For example, the reconstructed floating-point RF at the fourth row and fourth column of Table 3 is 2.2 which differs from the original floating-point F at the fourth row and fourth column of Table 1 which is 2.25. In other words, through the conversion of the floating-point numbers F to the integer numbers and determining reconstructed floating-point number RF, some of information may be lost.

TABLE 4

$$\begin{bmatrix} 1.00 & 1.2 & 1.5 & 1.7 \\ 1.2 & 1.5 & 1.7 & 2.0 \\ 1.5 & 1.7 & 2.0 & 2.2 \\ 1.7 & 2.0 & 2.2 & 2.2 \end{bmatrix}$$

The computer 140 may be programmed to store the converted floating-point numbers F in the computer 140 memory, reconstruct the floating-point numbers (denoted by RF) based on data stored in the computer 140 memory, and perform vehicle 100 operations, e.g., propulsion, steering, braking, based on the reconstructed floating-point numbers RF. As another example, the computer 140 may be programmed to actuate a vehicle 100 component, e.g., a communication interface, to transmit the compressed integer numbers representing, e.g., the LIDAR sensor 130 data, to a second processor, e.g., the vehicle 100 computer 110, coupled to the vehicle 100 communication network. The vehicle 100 computer 110 may be programmed to reconstruct floating-point numbers RF based on the received data from the sensor 130 computer 140, and perform one or more vehicle 100 operation based on the reconstructed floating-point numbers RF.

Processing

Figure 3:
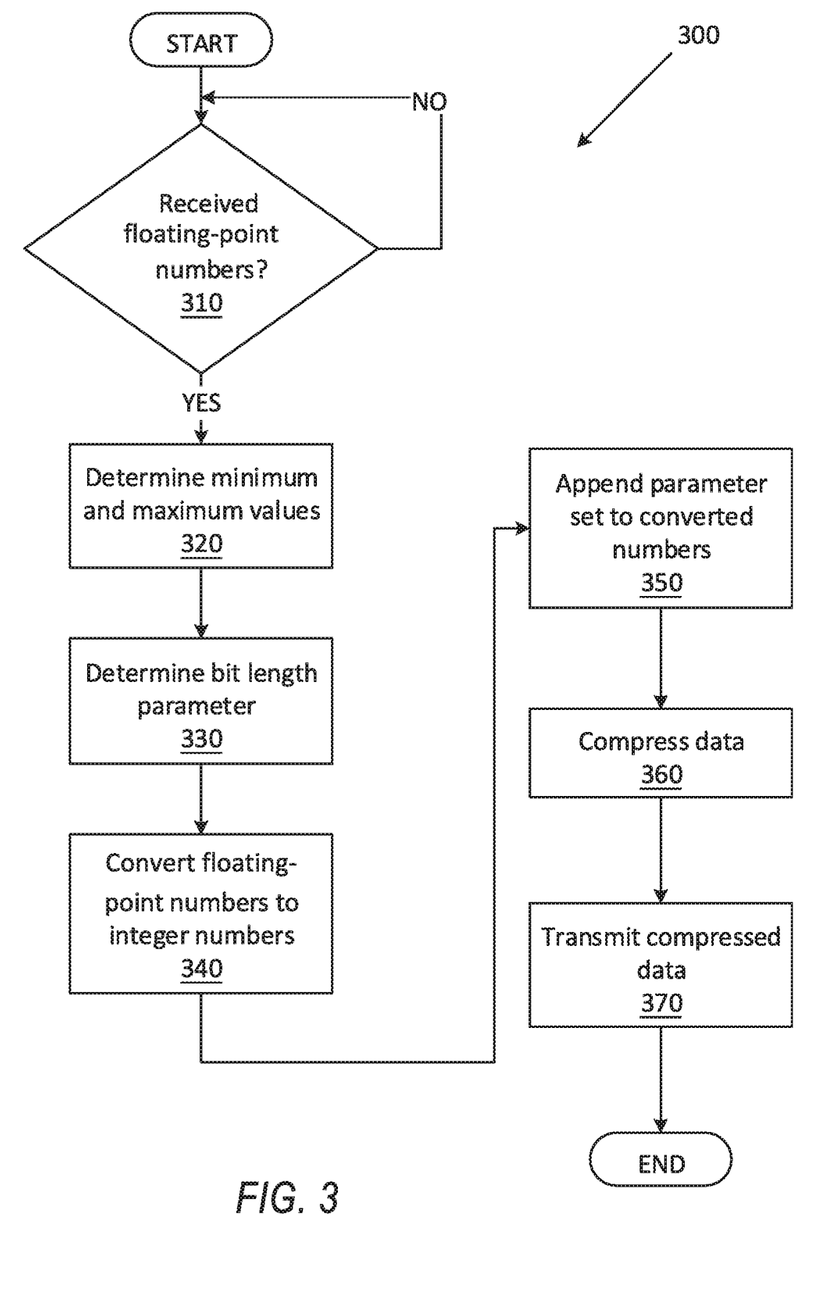
FIG. 3 is a flowchart of an exemplary process for compressing and transmitting data.

FIG. 3 is a flowchart of an exemplary process 300 for compressing and transmitting data. For example, the LIDAR sensor 130 computer 140 may be programmed to execute blocks of the process 300.

The process 300 begins in a decision block 310, in which the computer 140 determines whether floating-point number(s) F, e.g., the z-height map data, are received. If the computer 140 determines that the floating-point numbers F are received, then the process 300 proceeds to a block 320; otherwise the process 300 returns to the decision block 310.

In the block 320, the computer 140 a maximum Max and a minimum Min of the received floating-point numbers F. For example, the computer 140 may be programmed to determine the maximum Max and minimum Min of the received Table 1 including the floating-point numbers F.

Next, in a block 330, the computer 140 determines the bit length parameter based on the determined maximum Max, minimum Min, and a stored precision Prec. Additionally or alternatively, the computer 140 may be programmed to receive the precision parameter Prec from a remote computer.

Next, in a block 340, the computer 140 converts the received floating-point numbers F to integer numbers I, e.g., based on the operation (3) discussed above.

Next, in a block 350, the computer 140 appends the parameter set to the integer numbers I. For example, the computer 140 may be programmed to include the parameter set in a message that is prepared for transmission, e.g., to the vehicle 100 computer 110.

Next, in a block 360, the computer 140 compresses the data output from the block 350. For example, the computer 140 may be programmed to compress the integer numbers I using a known data compression algorithm. Additionally, the computer 140 may be programmed to compress the parameter set.

Next, in a block 370, the computer 140 transmits the compressed data. The computer 140 may be programmed to transmit the compressed data, e.g., including the integer numbers I and the parameter set, in one or more messages to a second computer. Additionally or alternatively, the computer 140 may be programmed to broadcast the compressed data via the vehicle 100 communication network. Alternatively, the computer 140 may be programmed to transmit the data including the integer numbers and the parameter set without compressing the date prior to transmission, i.e., without applying a compression algorithm to the integer numbers.

Following the block 370, the process 300 ends, or alternatively returns to the decision block 310, although not shown in FIG. 3.

Figure 4:
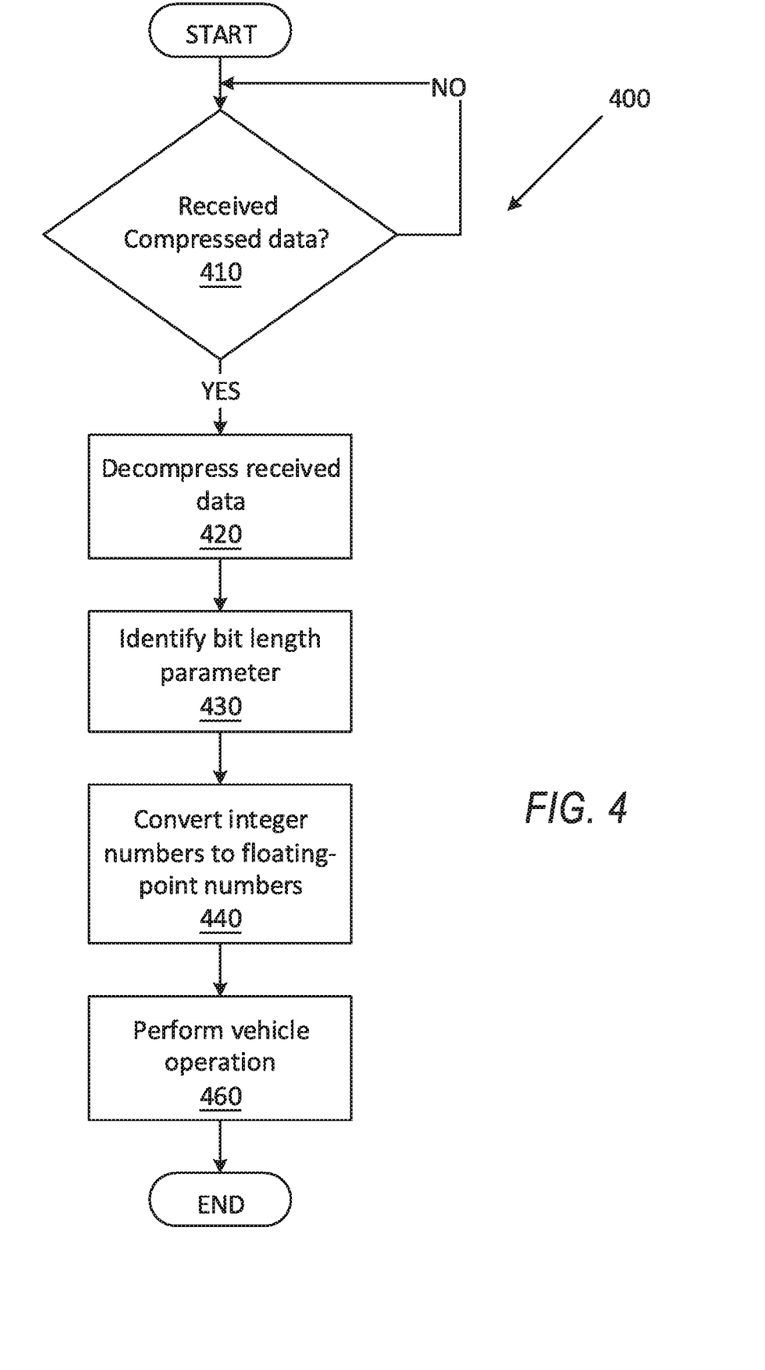
FIG. 4 is a flowchart of an exemplary process for receiving data and decompressing received data.

FIG. 4 is a flowchart of an exemplary process 400 for receiving and decompressing the received data. For example, a vehicle 100 computer 110 and/or a remote computer may be programmed to execute blocks of the process 400.

The process 400 begins in a decision block 410, in which the vehicle 100 computer 110 determines whether the compressed data are received. For example, the vehicle 100 computer 110 may be programmed to receive the compressed data from the sensor 130 computer 140 via the vehicle 100 communication network. For example, the parameter set may be appended to the integer numbers I in one or more received message(s) from the computer 110. In another example, the computer 110 may be programmed to retrieve compressed data from the computer 110 memory. In other words, the computer 110 may be programmed to receive data that was converted by the blocks of the process 300 and stored in the computer 110 memory. In this example, the parameter set may be stored in the computer 110 memory. If the vehicle 100 computer 110 determines that the compressed data is received, then the process 400 proceeds to a block 420; otherwise the process 400 returns to the decision block 410.

In the block 420, the vehicle 100 computer 110 decompresses the received compressed data. For example, the vehicle 100 computer 110 may be programmed to decompress the received compressed data and parse the integer numbers. The vehicle 100 computer 110 may be programmed to decompress the received compressed data using a decompression algorithm corresponding to the compression algorithm that was used to compress the data, e.g., stored in a vehicle 100 computer 110 memory. Alternatively, the vehicle 100 computer 110 may be programmed to receive the integer numbers. Thus, in such an example, the optional block 420 may be unnecessary.

Next, in a block 430 the vehicle 100 computer 110 identifies the bit length parameter BLP. The vehicle 100 computer 110 may be programmed to identify the parameter set in the decompressed data.

Next, in a block 440, the vehicle 100 computer 110 converts the integer numbers I to reconstructed floating-point numbers RF. The vehicle 100 computer 110 may be programmed to determine the reconstructed floating-point numbers RF based on the integer numbers I and the parameter set, using the operation (4).

Next, in a block 460, the vehicle 100 computer 110 performs vehicle 100 operation based on the reconstructed floating-point numbers RF. For example, the vehicle 100 computer 110 may be programmed to operate at least one of the vehicle 100 propulsion, steering, and braking based on the reconstructed floating-point numbers RF.

Following the block 460, the process 400 ends, or alternatively returns to the decision block 410, although not shown in FIG. 4.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a processor and a memory, the memory storing instructions executable by the processor to:
    receive LIDAR sensor data including floating-point numbers;
    convert the floating-point numbers to integer numbers based on a parameter set including a bit length parameter;
    determine the bit length parameter based on the LIDAR sensor data; and
    actuate a vehicle component based on the integer numbers.

2. The system of claim 1, wherein the instructions further include instructions to:
    determine as parameters a maximum and a minimum of the floating-point numbers; and
    determine the bit length parameter based on the minimum and maximum as well as a stored precision parameter.

3. The system of claim 1, wherein the instructions further include instructions to convert the floating-point numbers to the integer numbers based on the bit length parameter.

4. The system of claim 1, wherein the instructions further include instructions to apply a compression algorithm to the integer numbers and actuate the vehicle component by transmitting the compressed integer numbers representing LIDAR sensor data to a second processor.

5. The system of claim 4, wherein the instructions further include instructions to transmit the parameter set with the compressed integer numbers representing LIDAR sensor data to the second processor.

6. The system of claim 5, further comprising the second processor and a second memory, the second memory storing instructions executable by the processor to decompress the compressed integer numbers representing LIDAR sensor data.

7. The system of claim 6, wherein decompressing the compressed integer numbers further includes:
    decompressing the compressed integer numbers; and
    then converting the decompressed integer numbers to the floating-point numbers.

8. The system of claim 7, wherein the instructions further include instructions to convert the decompressed integer numbers based on a bit length parameter.

9. The system of claim 1, wherein the LIDAR sensor data includes z-Height map data and the instructions further include instructions to determine the z-Height map data based on received reflections at a vehicle LIDAR sensor from a vehicle exterior area.

10. A method, comprising:
    receiving LIDAR sensor data including floating-point numbers;
    converting the floating-point numbers to integer numbers based on a parameter set including a bit length parameter;
    determining the bit length parameter based on the LIDAR sensor data; and
    actuating a vehicle component based on the integer numbers.

11. The method of claim 10, further comprising:
    determining as parameters a maximum and a minimum of the floating-point numbers; and
    determining the bit length parameter based on the minimum and maximum as well as a stored precision parameter.

12. The method of claim 10, further comprising converting the floating-point numbers to the integer numbers based on the bit length parameter and applying a compression algorithm to the integer numbers.

13. The method of claim 12, further comprising decompressing, in a second processor, the compressed integer numbers representing LIDAR sensor data.

14. The method of claim 13, wherein decompressing the compressed integer numbers further includes:
    decompressing the compressed integer numbers; and
    then converting the decompressed integer numbers to the floating-point numbers.

15. The method of claim 14, further comprising converting the decompressed integer numbers based on the bit length parameter.

16. A system, comprising:
    a sensor comprising a first processor and a first memory, the first memory storing instructions executable by the first processor to:
        receive LIDAR sensor data including floating-point numbers;
        convert the floating-point numbers to integer numbers based on a parameter set including a bit length parameter;
        determine the bit length parameter based on the LIDAR sensor data;
        apply a compression algorithm to the integer numbers; and
        transmit the compressed integer numbers via a communication network;
    and a computer comprising a second processor and a second memory, the second memory storing instructions executable by the second processor to:
        receive the compressed integer numbers;
        decompress the compressed integer numbers; and
        convert the decompressed integer numbers to the floating-point numbers; and perform a vehicle operation based on the floating numbers.

17. The system of claim 16, wherein the instructions stored in the first memory further include instructions to:
- determine as parameters a maximum and a minimum of the floating-point numbers; and
- determine the bit length parameter based on the minimum and maximum as well as a stored precision parameter.

* * * * *